United States Patent
Juhas (10) Patent No.: US 9,950,770 B2
(45) Date of Patent: Apr. 24, 2018

(54) MULTISPEED INTERNALLY GEARED HUB WITH SELECTABLE FIXED GEAR

(71) Applicant: GM Global Technology Operations LLC, Detroit, MI (US)

(72) Inventor: Martin Juhas, Ottawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 15/159,270

(22) Filed: May 19, 2016

(65) Prior Publication Data

US 2017/0334520 A1   Nov. 23, 2017

(51) Int. Cl.
  *B62M 11/16*    (2006.01)
  *B62M 11/18*    (2006.01)
  *B62M 6/55*    (2010.01)

(52) U.S. Cl.
  CPC ............... *B62M 11/16* (2013.01); *B62M 6/55* (2013.01); *B62M 11/18* (2013.01)

(58) Field of Classification Search
  None
  See application file for complete search history.

(56) References Cited

U.S. PATENT DOCUMENTS

| 4,373,407 A * | 2/1983 | Okubo | F16D 21/06 192/48.92 |
|---|---|---|---|
| 2009/0036261 A1* | 2/2009 | Hino | B62M 11/16 475/318 |
| 2009/0203490 A1* | 8/2009 | Fukui | B62M 11/16 475/297 |
| 2012/0097467 A1* | 4/2012 | Maeno | B62M 6/55 180/206.7 |
| 2012/0100948 A1* | 4/2012 | Lin | B62M 6/65 475/149 |

* cited by examiner

*Primary Examiner* — Justin Holmes
*Assistant Examiner* — Timothy Hannon
(74) *Attorney, Agent, or Firm* — Lorenz & Kopf, LLP (57) ABSTRACT

A number of variations may include a product that may include a hub. A linked element may be connected with the hub to provide at least one of an input or an output from the hub. The hub may include a shell, a shaft may extend through the shell, and a gear set may be disposed in the shell. The linked element may be connected to the gear set through a rotatable element. A rotatable component may be connected with the gear set. The rotatable element may be engageable with the rotatable component through the gear set. An engagement mechanism may engage and may disengage the gear set from at least one of the shaft or the shell.

16 Claims, 5 Drawing Sheets

MULTISPEED INTERNALLY GEARED HUB WITH SELECTABLE FIXED GEAR

TECHNICAL FIELD

The field to which the disclosure generally relates includes cycles and more particularly, cycles having internal gear hubs.

BACKGROUND

A cycle may have various wheel arrangements and may be propelled through manual power, machine power, or both. Linking and gearing arrangements may be employed to effect fixed or variable driving relationships between the power input and at least one wheel.

SUMMARY OF ILLUSTRATIVE VARIATIONS

A number of variations may involve a product that may include a hub. A linked element may be connected with the hub to provide at least one of an input or an output from the hub. The hub may include a shell. A shaft may extend through the shell, and a gear set may be disposed in the shell. The linked element may be connected to the gear set through a rotatable element. A rotatable component may be connected with the gear set. The rotatable element may be engageable with the rotatable component through the gear set. An engagement mechanism may engage and may disengage the gear set from at least one of the shaft or the shell.

A number of additional variations may involve a product that may include a hub. A linked element may be connected with the hub and may provide at least one of an input or an output from the hub. A shell may be provided at the hub. A wheel may be attached to the shell. A shaft may extend through the shell. The shaft may be non-rotatable. A gear set may be disposed in the shell. The linked element may be connected to the gear set through a rotatable element. A rotatable component may be connected with the gear set. The rotatable element may be engageable with the rotatable component through the gear set. A first engagement mechanism may engage and may disengage the gear set from at least one of the shaft or the shell. A second engagement mechanism may engage and may disengage the gear set from the shell.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
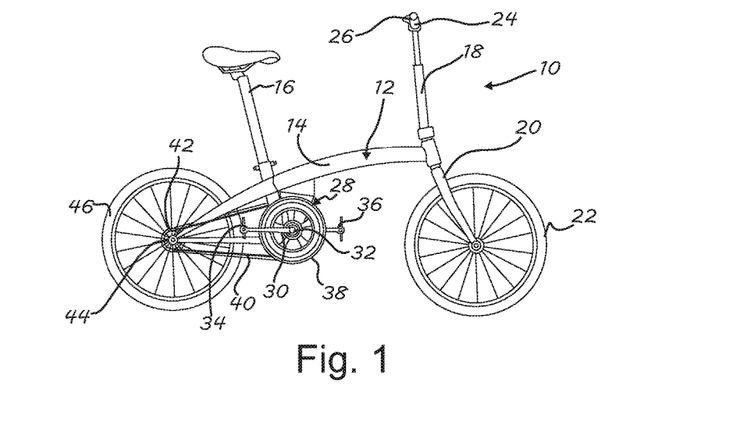
FIG. 1 illustrates a side view of a cycle according to a number of variations.

FIG. 1 illustrates a number of variations which may include a cycle 10. In any of a number of variations, the cycle 10 may include a frame 12 which may include a top or main tube 14 that may be connected to a seat tube 16. A steering tube 18 may extend from the main tube 14. The steering tube 18 may be operatively connected to a front fork 20 which may be attached to a front wheel 22. Handlebars 24 may be attached to the steering tube 18 and may be used to control the direction of the front wheel 22 by way of the front fork 20. Control levers 26 may be provided on or near the handlebars 24 and may be constructed and arranged to communicate with one or more input receiving devices on the cycle 10. The one or more input receiving devices may include brakes, shifters, a propulsion system 28, electronic controllers, or other devices.

The cycle 10 may include a crank assembly 30 which may include a crankshaft 32 having a first pedal assembly 34 and a second pedal assembly 36 connected thereto. A linked element 38, which may be a sprocket, a pulley, or other mechanism that provides linking, may be operatively connected to the crankshaft 32 for driving a linking member 40. The linking member 40 may be a chain or belt or another form of link suitable for engaging the linked element 38. The linking member 40 may be operatively connected to a rear linked element 42, which may be a sprocket, a pulley, or other mechanism, and which may be operatively connected to a hub 44 of a rear wheel 46. The hub 44 may include a shell 48 (shown in FIG. 2), that may be fixedly connected to rotate with the rear wheel 46 such as through a series of spokes. The hub 44 may be an internal gear hub that may provide a number of operating modes.

The cycle 10 may be constructed and arranged to allow a rider to rotate the first and second pedal assemblies 34, 36 to power the cycle 10. In a number of variations the cycle 10 may be constructed and arranged to enable a rider to use the propulsion system 28, which may be an electric propulsion system. The cycle 10 may be a bicycle, tricycle, or four-wheel cycle having a crank assembly 32 that may be constructed and arranged to respond to rider pedal propulsion, an electric powered propulsion system, or both.

Figure 2:
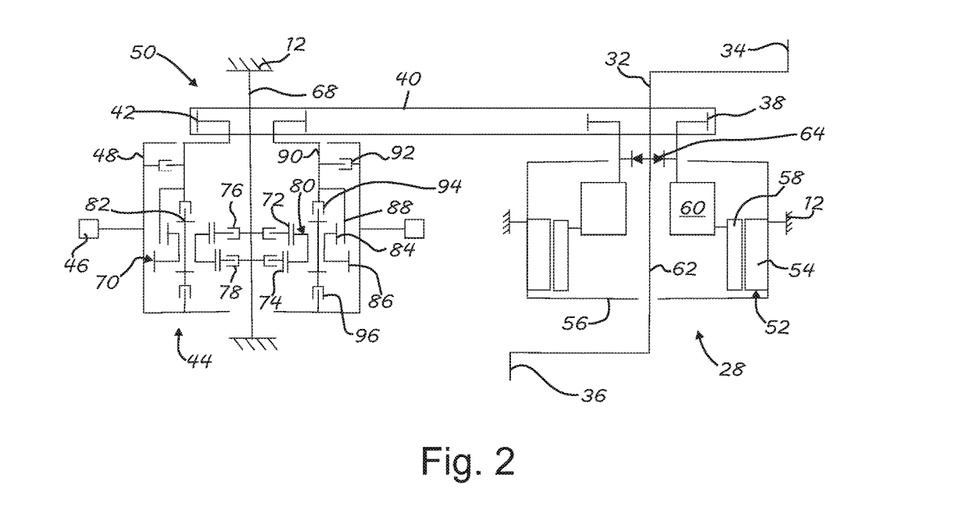
FIG. 2 illustrates a schematic of a cycle powertrain according to a number of variations.

A number of variations as illustrated in FIG. 2 are shown in schematic diagram form. Referring to FIG. 2 along with FIG. 1, in a number of variations the cycle 10 may include a product 50 that may include the crank assembly 32, and may include the propulsion system 28, one or both of which may be linked with the hub 44. The propulsion system 28 may include an electric machine 52 which may be used to propel the cycle 10 forward, in reverse, and/or to generate electricity from motor/generator braking. The electric machine 52 may comprise any of a number of types of motors and/or generators suitable for mid-drive cycle systems. The electric machine 52 may include a stator 54, which may be attached or grounded to the electric cycle 10 such as at the frame 12. Attachment may be accomplished through a case 56. A rotor 58 may rotate within the stator 54. The electric machine 52 may be powered by a battery or any number of batteries or battery assemblies. In a number of variations, one or more gear units 60 may be located within the case 56 and may operate with the electric machine 52. In one variation, the gear unit 60 may include a planetary gear set, or may include a compound planetary gear set, or may include another type of gear set. The gear unit 60 may be operatively connected with the electric machine 52 and may be included therewith as part of a common assembly, or may be comprised of two, or multiple, separate interconnected elements. The gear unit 60 may be used to provide an advantageous gear ratio or ratios for the electric machine 52, and may include clutching or other active or passive interconnecting devices. The gear unit 60 may support operation of the electric machine 52 to drive the cycle 10 through wheel 46, may support operation of regenerative braking system where the wheel 46 may drive the electric machine 52, and/or may support alternative or combined operation of the electric machine 52 and the crank assembly 32. The electric machine 52 and the gear unit 60 may support forward drive of the cycle 10, may support reverse drive of the cycle 10, and/or may support a neutral mode. The electric machine 52 and the gear unit 60 and/or the crank assembly 32, may be connected with the hub 44 through the linked elements 38, 42 and the linking member 40.

In a number of variations the crank assembly 32 may include a crankshaft 62 that may extend through the gear unit 60. The crankshaft 62 may be connected with the gear unit 60 through an engagement mechanism 64. In a number of variations, the engagement mechanism 64 may include a device to engage or disengage the crankshaft 62. The engagement mechanism 64 may be include a clutch and/or may include a one-way clutch mechanism, and/or may include a two-way clutch mechanism, and may include overrunning. The engagement mechanism 64 may communicate a driving input power from the crankshaft 62 to the linked element 38. The engagement mechanism 64 may allow the linked element 38 to be driven by the electric machine 52 faster than by the crankshaft 62. The engagement mechanism 64 may allow the linked element 38 to rotate faster than the crankshaft 62, such as for regenerative braking powered by the wheel 46. The engagement mechanism 64 may allow the electric machine 52 and gear unit 60 to drive the linked element 38 in reverse, without causing the crank assembly 32 to rotate.

In a number of variations the hub 44, may cooperate with the crank assembly 32 and/or the propulsion system 28, to provide the neutral mode, a fixed gear connection, a semi-fixed gear connection, and/or free-wheel in either direction. The hub 44 may include a shaft 68 that may be an axle shaft and that may be grounded to be non-rotating, such as by engaging with the frame 12. The shaft 68 may be connected with a gear set 70, such as at gear 72 and/or 74. The respective gear 72, 74 may be a sun gear in the gear set 70. Each gear 72, 74 may be connected with the shaft 68 through an engagement mechanism 76, 78 respectively. The engagement mechanisms 76, 78 may include a clutch, or may include a sliding key clutch, or may include another mechanical mechanism, which may provide a connection between the gear set 70 and the shaft 68 when closed or engaged, and that may permit relative rotation between the shaft 68 and the respective gear 72, 74 when open or disengaged. In a number of variations the engagement mechanisms 76, 78 may be included in a one clutch assembly such as one sliding key clutch assembly on the shaft 68. In a number of variations at least one of the engagement mechanisms 76, 78 may include a dual pawl mechanism to provide bi-directional engagement/disengagement, and may be actively controlled. Such an engagement mechanism for providing a connection between a sun gear and the shaft 68 is described in greater detail below.

In a number of variations the gears 72, 74 may mesh with a gear or gears 80, which may be planet gears. In a number of variations the gear or gears 80 may each be carried by a carrier 82. The gear or gears 80 may have different sized pinions 84, 86 of a stepped planet arrangement of the gear(s) 80. In comparison to each other, the pinion 86 may have a larger diameter and the pinion 84 may have a smaller diameter to provide different gear ratios. In a number of variations the pinion 84 may mesh with a gear 88, which may be a ring gear that may include internal teeth. The gear 88 may be connected to an element 90 that may be connected to the linked element 42. The element 90 may be a rotatable structure that may fit within the hub 44 and that may provide a connection through which torque may be transferred. The element 90 may be a drive cone, or a part thereof, that is rotatable relative to the shell 48 and that may be connected with the linked element 42. In a number of variations the gear 88 may be connectable directly to the shell 48 such as through an engagement mechanism 92. The engagement mechanism 92 may include a clutch, or may include a dual pawl mechanism to provide bi-directional engagement/disengagement, and may be actively controlled. Such an engagement mechanism for providing a connection between the ring gear 88 and the shell 48 is described in greater detail below.

In a number of variations the carrier 82 may be engageable with the element 90 through an engagement mechanism 94. The engagement mechanism 94 may include a clutch or may include a dog clutch, or may be another mechanical mechanism that may provide torque transfer between the carrier 82 and the element 90, when engaged, and may permit relative rotation between the carrier 82 and the element 90 when disengaged. In a number of variations the carrier 82 may be connectable with the shell 48 through an engagement mechanism 96. The engagement mechanism 96 may be a clutch that may be a one way clutch or that may be a selectable one way clutch, or that may be a bi-directional selectable one way clutch. The engagement mechanism 96 may provide torque transfer between the carrier 82 and the shell 48 when engaged, or may provide relative rotation between the carrier 82 and the shell 48 when disengaged, and/or may provide torque transfer in one direction of rotation and overrunning operation in the other direction of rotation, and/or may provide torque transfer from one element to the other, but not the opposite, in both directions of rotation. A variation of the engagement mechanism 96 is described in greater detail below.

Figure 3:
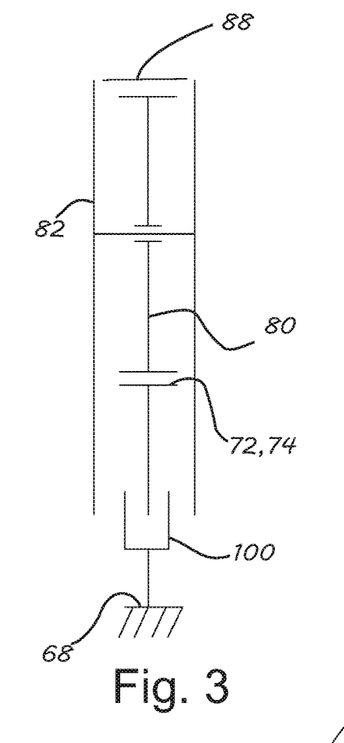
FIG. 3 illustrates a gear set and engagement mechanism in schematic form, according to a number of variations.
Figure 4:
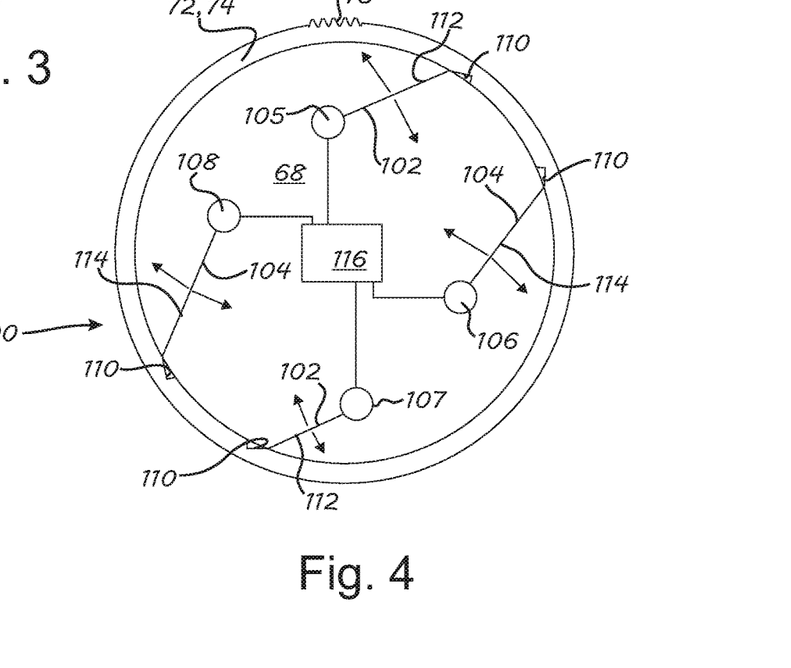
FIG. 4 illustrates an engagement mechanism in schematic form according to a number of variations.

In a number of variations the engagement mechanism 76 and/or 78 may comprise a dual pawl engagement mechanism 100 as illustrated in FIGS. 3 and 4. The shaft 68 may be engageable with the gear 72 and/or the gear 74 through the dual pawl engagement mechanism 100. Exemplary teeth 75 are shown in FIG. 4, with the understanding that they exist around the outer perimeter of the respective gear 72, 74. The gear(s) 80 may mesh with the respective gear 72, 74, and may be supported on the carrier 82. The gear 88 may mesh with the gear(s) 80. Engagement of the respective gear 72, 74 with the non-rotating shaft 68 may have an effect on rotation of the gear(s) 80, carrier 82 and gear 88, in either rotational direction. For example, when input is received via rotation of the gear 88, such as may be provided from the linked element 42 when the dual pawl engagement mechanism 100 is engaged, a reduction may be provided through the gear set 70 with output at the carrier 82, which may be used to propel the cycle 10. Also for example, when input is received via rotation of the carrier 82, such as may be provided from the shell 48, when the dual pawl engagement mechanism 100 may be engaged, a reduction may be provided through the gear set 70 with output at the gear 88, which may be used to provide regenerative braking. When the dual pawl engagement mechanism 100 is disengaged, neutral may be provided with no output at the carrier 82 or the gear 88. Given the different sizes of the gears 72, 74, different proportional reductions may be provided when the engagement mechanism 76 is engaged as compared to when the engagement mechanism 78 is engaged. As shown in FIG. 4, the dual pawl engagement mechanism 100, may include multiple first pawls 102 that may be engageable for one direction of rotation, and multiple second pawls 104 that may be engageable in the opposite direction of rotation. The first and second pawls 102, 104 may be carried on the non-rotating shaft 68 at pins 105-108, to allow rotation between engaged and disengaged positions as shown by the respective arrows. The respective gear 72, 74 may be disposed around the shaft 68 and may include notches 110 into which the first and second pawls 102, 104 may be engaged. The first pawls 102 may include arms 112 extending in a first direction from the pins 105, 107 (clockwise in FIG. 4), and the second pawls 104 may include arms 114 extending in an opposite second direction from the pins 106, 108 (counter-clockwise in FIG. 4), toward the gear 72, 74. It will be appreciated that directions are given only as reference for purposes of description, and may be subject to the perspective of a given view. The first and second pawls 102, 104 may be active, in-that they may be controlled and moved between engagement and disengagement by an actuator 116, or multiple actuators that may be linked to the pawls 102, 104. The actuators(s) 116 may be motors, or other rotation imparting devices that may be connected to the first and second pawls 102, 104 directly or indirectly, such as through an actuator ring. When the pawls 102 are actuated to rotate counter-clockwise, the arms 112 may engage in the notches 110 so that the respective gear 72, 74 is held against rotation in the counter-clockwise direction relative to the shaft 68. In this condition, the respective gear 72, 74 may rotate clockwise relative to the shaft 68. When the pawls 104 are actuated to rotate clockwise, the arms 114 may engage in the notches 110 so that the respective gear 72, 74 is held against rotation in the clockwise direction relative to the shaft 68. In this condition, the respective gear 72, 74 may rotate counter-clockwise relative to the shaft 68. To hold the gear 72, 74 from rotating in both directions relative to the shaft 68, both pawl sets 102, 104 may be engaged in the notches 110. To allow the respective gear 72, 74 to rotate in both directions relative to the shaft 68, both pawls 102, 104 may be disengaged. Through these condition, the actuator(s) 116 may provide the options of neutral, freewheeling ability in either direction, or a fixed gear train.

Figure 5:
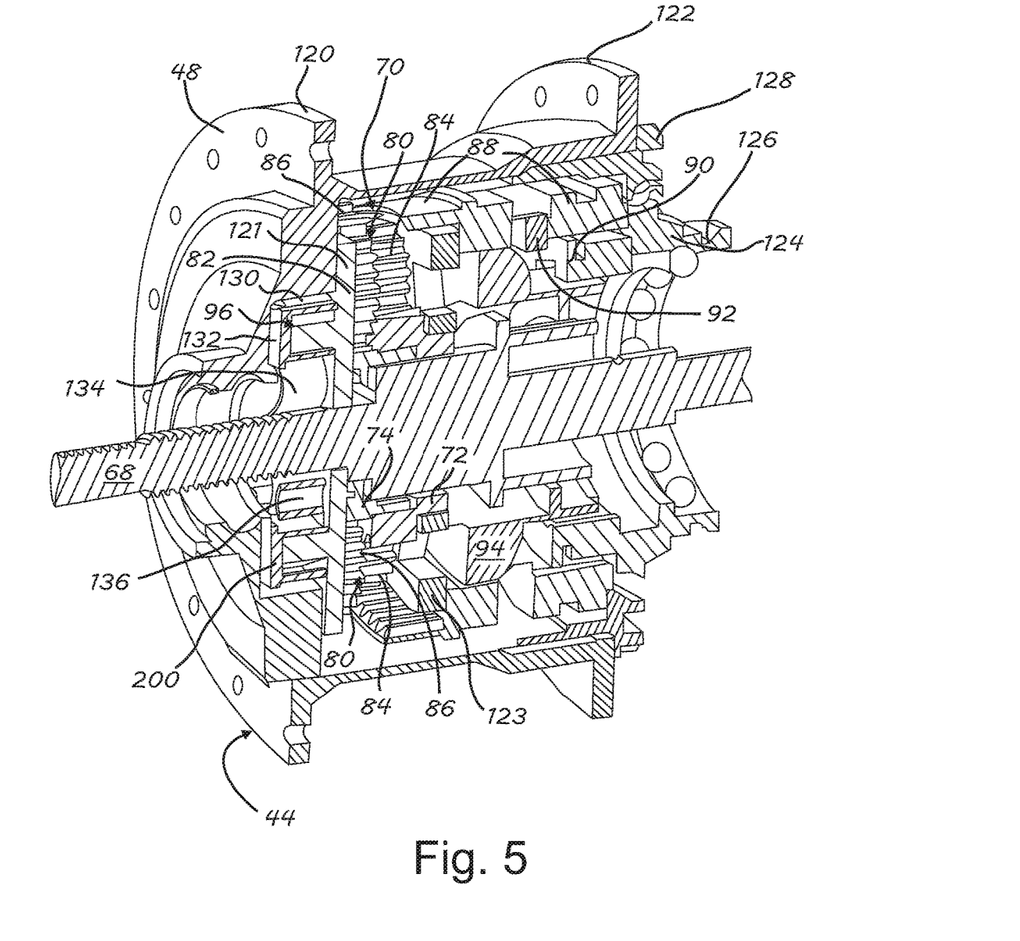
FIG. 5 illustrates a hub in sectioned form, according to a number of variations.

With reference to FIG. 5, the hub 44 according to a number of variations, is illustrated sectioned to show internal components. The shell 48 may house the internal components and may provide a connection to the wheel 46, such as at flanges 120, 122. The axle 68 may extend through the center of the shell 48 and may be fixed to the frame 12. The drive cone 124 may extend into the shell 48 and may be connected to the linked element 42, such as at a flange 126. The drive cone 124 may include the element 90 that may have an interference fit with the gear 88. The gear set 70 may include the gears 72, 74, the gears 80, and the gear 88. The engagement mechanisms 76, 78 between the gears 72, 74 and the shaft 68, are concealed in this view. The gears 80 may be supported on the carrier 82, which may include components (outboard 121 and inboard 123), on either side of the gear(s) 80. A retainer 128 may be fixed to the shell 48, such as by threads, and may assist in holding the internal components in the shell 48. The ring gear 88 may be engageable with the shell 48 (which may occur through the retainer 128), through the engagement mechanism 92, which may include pawls carried on pins. The carrier 82 may be engageable with the drive cone 124 through the engagement mechanism 94. The engagement mechanism 96 may be positioned to provide engagement between the outboard component 121 of the carrier 82 and the shell 48. The engagement mechanism 96 may include rollers 130, engageable between the outboard component 121 and the shell 48, and may include a control ring 132 and springs 134, 136.

Figure 6:
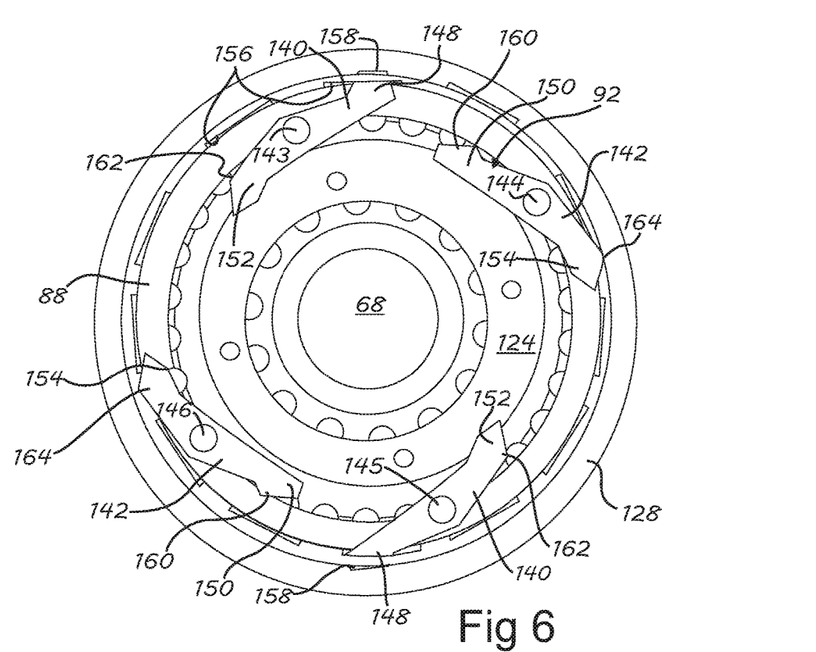
FIG. 6 illustrates a part of a hub according to a number of variations.
Figure 7:
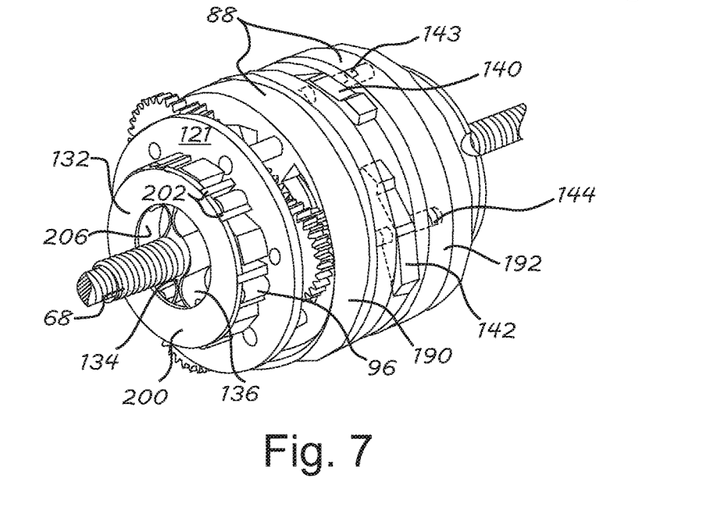
FIG. 7 illustrates a part of a hub in perspective view, according to a number of variations.

In a number of variations as illustrated in FIG. 6, the engagement mechanism 92 may be a dual pawl engagement mechanism, and may include one or multiple first pawls 140 that may be engageable for one direction of rotation, and one or multiple second pawls 142 that may be engageable in the opposite direction of rotation. The first and second pawl(s) 140, 142 may be carried on the gear 88 at pins 143-146, which may allow rotation between engaged and disengaged positions. The first and second pawls 140, 142 may include arms 148, 150 respectively, and legs 152, 154 respectively. The retainer 128 may include a number of notches 156 into which the arms 148, 150 may be selectively engaged. The arms 148, 150 may include blocks 158, 160 that may fit into the notches 156. The legs 152, 154 may include double sided ramps 162, 164 respectively, that may ride through the notches 156 during relative rotation when the respective pawl is disengaged. The arms 148 of the first pawls 140 may extend from their respective pins in a first direction (clockwise in FIG. 6), and the arms 150 of the second pawls 142 may extend in an opposite second direction (counter-clockwise in FIG. 6), toward the retainer 128. The first and second pawls 140, 142 may be active, in-that they may be controlled and moved between engagement and disengagement by an actuator, or multiple actuators that may be linked to the pawls 140, 142. When the pawls 140 are actuated to rotate counter-clockwise, the blocks 158 may engage in the notches 156 so that the gear 88 may be held against rotation in a first direction relative to the retainer 128 and the shell 48. In this condition, the gear 88 may rotate in an opposite second direction relative to the shell 48 with the ramps 164 running through the notches 156 and the blocks 158 moving over the lugs 168 between the notches 156 by rotating the pawls 140. When the pawls 142 are actuated to rotate clockwise, the blocks 160 may engage in the notches 156 so that the gear 88 may be held against rotation in the second direction relative to the retainer 128 and the shell 48. In this condition, the gear 88 may rotate in the first direction relative to the shell 48 with the ramps 162 running through the notches 156 and the blocks 160 moving over the lugs 168 between the notches 156 by rotating the pawls 142. To hold the gear 88 from rotating in both directions relative to the shell 48, both pawls 140, 142 may be engaged in the notches 156. To allow the gear 88 to rotate in both directions relative to the shell 48, both pawls 140, 142 may be disengaged from the notches 156. With reference to FIG. 7, a part of the hub 44 is illustrated with the shell 48 and the retainer 128 removed to reveal the first and second pawls 140, 142. The pawls 140, 142 may be mounted to the gear 88 on shafts 143, 144, respectively. The shafts 143, 144 may extend between a first component 190 of the gear 88, and a second connected component 192 of the gear 88. In a number of variations the second component 192 may comprise the element 90 of FIG. 2, or a part thereof.

Figure 8:
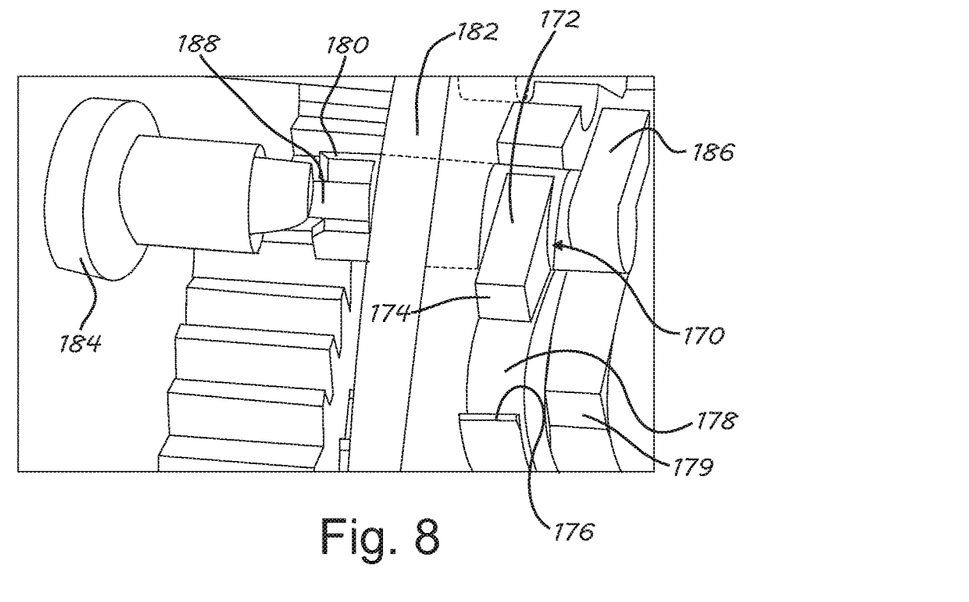
FIG. 8 illustrates a part of a hub according to a number of variations.

In a number of variations as illustrated in FIG. 8, a pawl locking mechanism 170 may include a pawl 172 with an arm 174. The arm 174 may be engageable in notches 176, for example in the component 178. A shaft 180 may be rotatably engaged in a component 182, and may be connected with the arm 174. The components 178, 182 may rotate relative to one another when the arm 174 is not engaged in a notch 176. The shaft 180 may be coupled with an actuator 184, such as a motor or other rotation imparting device. The actuator 184 may be used to selectively engage the arm 174 in a notch 176. The actuator 184 may be used to drive a second pawl 186 to engage the components 178, 182 in an opposite rotation direction than the pawl 172. The actuator 184 may be connected with the second pawl 186 through and inner shaft 188, and with the pawl 172 through the outer shaft 180, the two of which may be separately or jointly driven by the actuator 184. The second pawl 186 may be engaged in a notch 179 to engage the components 178, 182 preventing relative rotation in a direction opposite that prevented by the pawl 172.

Figure 9:
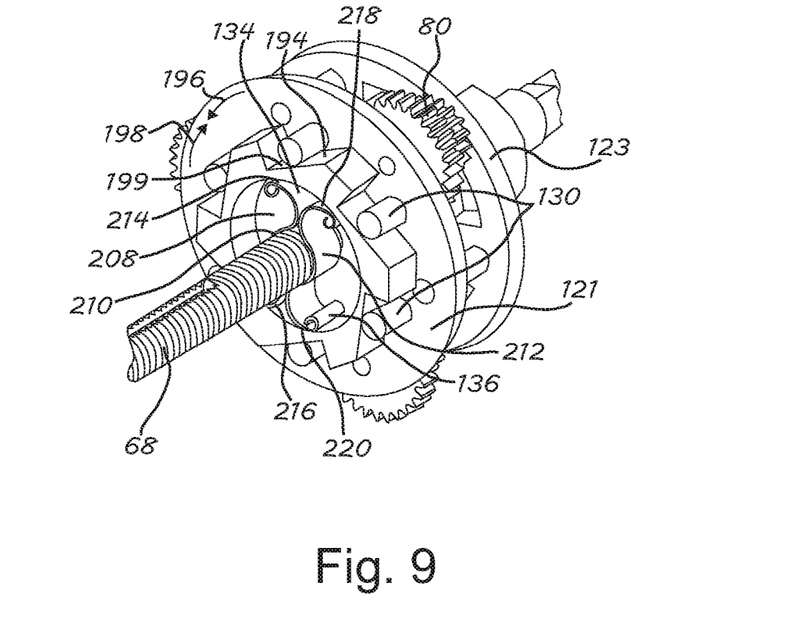
FIG. 9 illustrates a part of a hub according to a number of variations.

Referring again to FIG. 7, the engagement mechanism 96 may be positioned to provide engagement between the outboard component 121 of the carrier 82 and the shell 48 (shown in FIG. 5). The engagement mechanism 96 may include the rollers 130, that may lock between the outboard component 121 and the shell 48. With additional reference to FIG. 9, the rollers 130 may be carried in ramped depressions 194, in the outboard component 121. When the outboard component 121 rotates relative to the shell 48 in a first direction 196, the rollers 130 may roll up the ramps 197 and may lock between the first component 121 and the shell 48 to prevent relative rotation. When the outboard component 121 rotates relative to the shell 48 in a second direction 198, the rollers 130 may roll down the ramps 197 into pockets 199, with clearance to the shell 48, and may allow the first component 121 to rotate relative to the shell 48.

In a number of variations, the engagement mechanism 96 may include the control ring 132 (shown in FIG. 7), which may include an annular disc 200. The disc 200 may extend around the shaft 68. A number of pegs 202 may extend from the disc 200 toward the outboard component 121, and may register in the depressions 194. Each roller 130 may be disposed between a pair of pegs 202. A ring 206 (shown in FIG. 7), may extend from the disc 200 into a circular depression 208 in the outboard component 121. The control ring 132 may affect the position of the rollers 130 along the ramps 197, and may thereby affect the lockup/release of the engagement mechanism 96. In number of variations the springs 134, 136 may be disposed in the circular depression 208 (shown in FIG. 9 with the control ring 132 removed). The springs 134, 136 may include centers 210, 212 that may engage the shaft 68. The spring 134 may include ends 214, 216 that, when the control ring 132 is included as shown in FIG. 7, may engage with the control ring 132 such as at the ring 206. The spring 136 may include ends 218, 220 that, when the control ring 132 is included as shown in FIG. 7, may engage with the control ring 132 such as at the ring 206. The springs 136 may provide a frictional engagement between the non-rotating shaft 68 and the control ring 132. The frictional engagement may affect the engagement mechanism 96 so that torque transmission may not occur from the shell 48 (and the wheel 46), to the carrier 82 regardless of the direction of relative rotation between the shell 48 and the carrier 82. For example, when the carrier 82 and its outboard component 121 rotate in the first direction 196 (such as when driven by the linked element 42 when the engagement mechanism 92 is engaged), the rollers 130 may engage between the ramps 197 and the shell 48. The springs 134, 136 may create drag between the non-rotating shaft 68 and the control ring 132 causing the pegs 202 to urge the rollers 130 up the ramps 197 and into engagement. When the shell 48 is the driving member, such as during forward or reverse coasting of the cycle 10, the carrier 82 may not be rotating relative to the shaft 68, so that the springs 134, 136 provide no input to the roller 130 through the control ring 132. As a result, the engagement mechanism 96 will not lock up regardless of whether the relative rotation is in the first direction 196 or in the second direction 198. As a result, the engagement mechanism 96 transfers torque only from the carrier 82 to the shell 48, and only in one relative rotational direction. In other words, freewheeling may be provided with partially fixed gearing. Wheel input, such as for regenerative braking, may be provided when the dual pawl engagement mechanism 100 is engaged.

Through the variations described herein, a hub 44 that provides free-wheeling and may also enable regenerative braking where the wheel 46 drives the propulsion system 28 through the hub 44, in a system that provides any number of gears. A pair of actively controlled pawls may provide torque transmission and power in either direction, selectively. The variations enable effectively packaging five clutch type engagement mechanisms in the hub shell 48. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a hub. A linked element may be connected with the hub to provide at least one of an input or an output from the hub. The hub may include a shell, a shaft may extend through the shell, and a gear set may be disposed in the shell. The linked element may be connected to the gear set through a rotatable element. A rotatable component may be connected with the gear set. The rotatable element may be engageable with the rotatable component through the gear set. An engagement mechanism may engage and may disengage the gear set from at least one of the shaft or the shell.

Variation 2 may include the product according to variation 1 wherein the engagement mechanism may include a first pawl that may be engageable in a first rotational direction and a second pawl that may be engageable in a second rotational direction that is opposite to the first rotational direction. The pawls may enable or disable relative rotation in both the first and the second rotational directions between the gear set and the shell or shaft.

Variation 3 may include the product according to variation 2 and may include a second engagement mechanism that may engage and may disengage the gear set from the shell. The second engagement mechanism may include an outboard component of the gear set. A set of rollers may be engageable between the outboard component and the shell. A control ring may engage the set of rollers to prevent lockup of the shell and the outboard component, when the shell effects a rotation relative to the outboard component and the outboard component is non-rotating relative to the shaft.

Variation 4 may include the product according to variation 3 wherein the second engagement mechanism may include an outboard component of the gear set. A set of rollers may be engageable between the outboard component and the shell. A control ring may engage the set of rollers to prevent lockup of the shell and the outboard component, when the shell effects a rotation relative to the outboard component and the outboard component is non-rotating relative to the shaft.

Variation 5 may include the product according to variation 4 and may include a spring frictionally engaging the shaft and the control ring. The spring may urge the control ring to rotate when the outboard component rotates relative to the shaft.

Variation 6 may include the product according to variation 5 wherein the control ring may include an annular disc and a number of pegs extending from the annular disc. Each of the set of rollers may be disposed between a pair of the pegs.

Variation 7 may include the product according to variation 5 wherein the control ring may include an annular disc and may include a ring extending from the disc. The spring may engage the control ring at the ring.

Variation 8 may include the product according to variation 1 wherein the engagement mechanism may include a first pawl that may be engageable in a first rotational direction. A second pawl may be engageable in a second rotational direction that is opposite to the first rotational direction. The pawls may enable or disable relative rotation in both the first and the second rotational directions between the gear set and the shell or shaft. At least one actuator may engage the first and second pawls and may selectively move them between engagement and disengagement with the shell or the gear set.

Variation 9 may include the product according to variation 8 wherein the gear set may be a planetary gear set including a sun gear. The first and second pawls may be carried by the shaft and may be engageable with the sun gear.

Variation 10 may include the product according to variation 8 wherein the gear set may be a planetary gear set and may include a ring gear. The first and second pawls may be carried by the ring gear and may be engageable with the shell.

Variation 11 may involve a product that may include a hub. A linked element may be connected with the hub and may provide at least one of an input or an output from the hub. A shell may be provided at the hub. A wheel may be attached to the shell. A shaft may extend through the shell. The shaft may be non-rotatable. A gear set may be disposed in the shell. The linked element may be connected to the gear set through a rotatable element. A rotatable component may be connected with the gear set. The rotatable element may be engageable with the rotatable component through the gear set. A first engagement mechanism may engage and may disengage the gear set from at least one of the shaft or the shell. A second engagement mechanism may engage and may disengage the gear set from the shell.

Variation 12 may include the product according to variation 11 wherein the first engagement mechanism may include a first pawl that may be engageable in a first rotational direction and a second pawl that may be engageable in a second rotational direction that is opposite to the first rotational direction. The pawls may enable or disable relative rotation in both the first and the second rotational directions between the gear set and the shell or shaft.

Variation 13 may include the product according to variation 12 wherein the second engagement mechanism may include an outboard component of the gear set. A set of rollers may be engageable between the outboard component and the shell. A control ring may engage the set of rollers to prevent lockup of the shell and the outboard component, when the shell effects a rotation relative to the outboard component and the outboard component is non-rotating relative to the shaft.

Variation 14 may include the product according to variation 11 wherein the second engagement mechanism may include an outboard component of the gear set. A set of rollers may be engageable between the outboard component and the shell. A control ring may engage the set of rollers to prevent lockup of the shell and the outboard component, when the shell effects a rotation relative to the outboard component and the outboard component is non-rotating relative to the shaft.

Variation 15 may include the product according to variation 14 and may include a spring frictionally engaging the shaft and the control ring. The spring may urge the control ring to rotate when the outboard component rotates relative to the shaft.

Variation 16 may include the product according to variation 15 wherein the control ring may include an annular disc and a number of pegs extending from the annular disc. Each of the set of rollers may be disposed between a pair of the pegs.

Variation 17 may include the product according to variation 15 wherein the control ring may include an annular disc and may include a ring extending from the disc. The spring may engage the control ring at the ring.

Variation 18 may include the product according to variation 11 wherein the first engagement mechanism may include a first pawl that may be engageable in a first rotational direction. A second pawl may be engageable in a second rotational direction that is opposite to the first rotational direction. The pawls may enable or disable relative rotation in both the first and the second rotational directions between the gear set and the shell or shaft. At least one actuator may engage the first and second pawls and may selectively move them between engagement and disengagement with the shell or the gear set.

Variation 19 may include the product according to variation 18 wherein the gear set may be a planetary gear set including a sun gear. The first and second pawls may be carried by the shaft and may be engageable with the sun gear.

Variation 20 may include the product according to variation 18 wherein the gear set may be a planetary gear set and may include a ring gear. The first and second pawls may be carried by the ring gear and may be engageable with the shell.

The above description of select variations within the scope of the invention is merely illustrative in nature and, thus, variations or variants thereof are not to be regarded as a departure from the spirit and scope of the invention.

What is claimed is:
1. A product comprising a hub, a linked element connected with the hub to provide at least one of an input or an output from the hub, a shell, a shaft extending through the shell, a gear set disposed in the shell, the linked element connected to the gear set through a rotatable element, a rotatable component connected with the gear set, the rotatable element engageable with the rotatable component through the gear set, a first engagement mechanism engaging and disengaging the gear set from at least one of the shaft or the shell, and a second engagement mechanism engaging and disengaging the gear set from the shell wherein the second engagement mechanism comprises an outboard component of the gear set, a set of rollers engageable between the outboard component and the shell, and a control ring engaging the set of rollers to prevent lockup of the shell and the outboard component when the shell effects a rotation relative to the outboard component and the outboard component is non-rotating relative to the shaft.

2. The product according to claim 1 wherein the first engagement mechanism comprises a first pawl engageable in a first rotational direction and a second pawl engageable in a second rotational direction that is opposite to the first rotational direction to enable or disable relative rotation in both the first and the second rotational directions between the gear set and the shell or shaft.

3. The product according to claim 1 comprising a spring frictionally engaging the shaft and the control ring so that the spring urges the control ring to rotate when the outboard component rotates relative to the shaft.

4. The product according to claim 3 wherein the control ring comprises an annular disc and a number of pegs extending from the annular disc, each of the set of rollers disposed between a pair of the pegs.

5. The product according to claim 3 wherein the control ring comprises an annular disc and a ring extending from the disc, wherein the spring engages the control ring at the ring.

6. A product comprising a hub, a linked element connected with the hub to provide at least one of an input or an output from the hub, a shell, a shaft extending through the shell, a gear set disposed in the shell, the linked element connected to the gear set through a rotatable element, a rotatable component connected with the gear set, the rotatable element engageable with the rotatable component through the gear set, and an engagement mechanism engaging and disengaging the gear set from at least one of the shaft or the shell, wherein the engagement mechanism comprises a first pawl engageable in a first rotational direction, a second pawl engageable in a second rotational direction that is opposite to the first rotational direction to enable or disable relative rotation in both the first and the second rotational directions between the gear set and the shell or shaft, and at least one actuator engaging the first and second pawls and selectively moving them between engagement and disengagement with the shell or the gear set.

7. The product according to claim 6 wherein the gear set is a planetary gear set including a sun gear, and the first and second pawls are carried by the shaft and are engageable with the sun gear.

8. The product according to claim 6 wherein the gear set is a planetary gear set including a ring gear, and the first and second pawls are carried by the ring gear and are engageable with the shell.

9. A product comprising a hub, a linked element connected with the hub to provide at least one of an input or an output from the hub, a shell provided at the hub, a wheel attached to the shell, a shaft extending through the shell, the shaft non-rotatable, a gear set disposed in the shell, the linked element connected to the gear set through a rotatable element, a rotatable component connected with the gear set, the rotatable element engageable with the rotatable component through the gear set, and a first engagement mechanism engaging and disengaging the gear set from at least one of the shaft or the shell, and a second engagement mechanism engaging and disengaging the gear set from the shell, wherein the first engagement mechanism comprises a first pawl engageable in a first rotational direction and a second pawl engageable in a second rotational direction that is opposite to the first rotational direction to enable or disable relative rotation in both the first and the second rotational directions between the gear set and the shell or shaft.

10. The product according to claim 9 wherein the second engagement mechanism comprises an outboard component of the gear set, a set of rollers engageable between the outboard component and the shell, and a control ring engaging the set of rollers to prevent lockup of the shell and the outboard component when the shell effects a rotation relative to the outboard component and the outboard component is non-rotating relative to the shaft.

11. The product according to claim 9 comprising a spring frictionally engaging the shaft and the control ring so that the spring urges the control ring to rotate when the outboard component rotates relative to the shaft.

12. The product according to claim 11 wherein the control ring comprises an annular disc and a number of pegs extending from the annular disc, each of the set of rollers disposed between a pair of the pegs.

13. The product according to claim 11 wherein the control ring comprises an annular disc and a ring extending from the disc, wherein the spring engages control ring at the ring.

14. The product according to claim 9 comprising at least one actuator engaging the first and second pawls and selectively moving them between engagement and disengagement with the shell or the gear set.

15. The product according to claim 14 wherein the gear set is a planetary gear set including a sun gear, and the first and second pawls are carried by the shaft and are engageable with the sun gear.

16. The product according to claim 14 wherein the gear set is a planetary gear set including a ring gear, and the first and second pawls are carried by the ring gear and are engageable with the shell.

* * * * *